Nov. 9, 1965 J. T. HARTMEISTER 3,216,309
OPTICAL RANGEFINDER AND TELESCOPE COMBINATION
WITH SCALE READING REFLECTORS
Filed Jan. 18, 1962
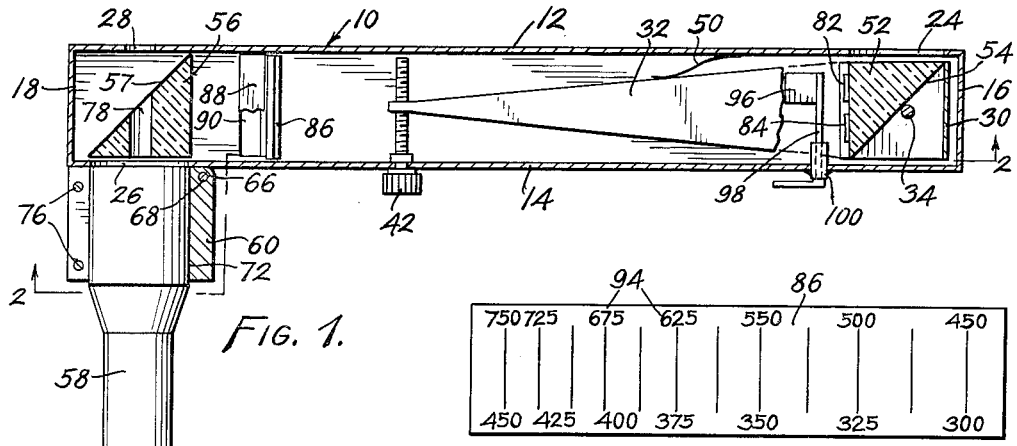
FIG. 1.
FIG. 4.
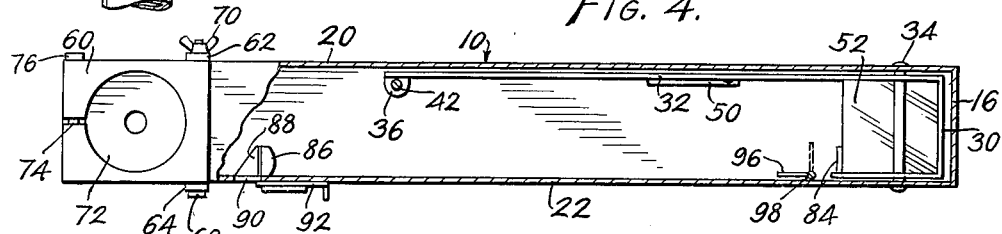
FIG. 2.
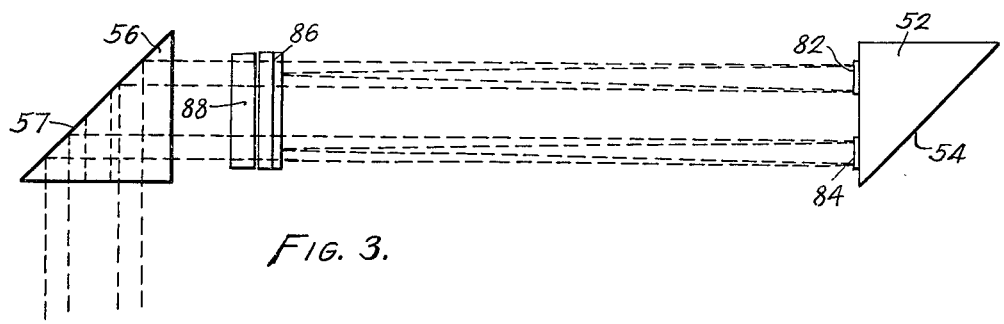
FIG. 3.
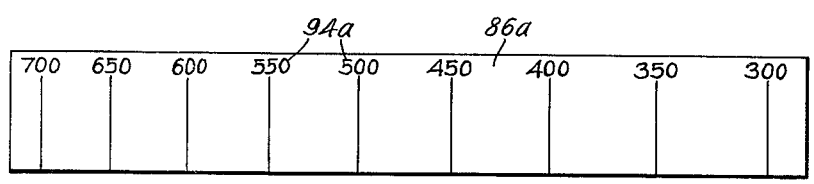
FIG. 5.
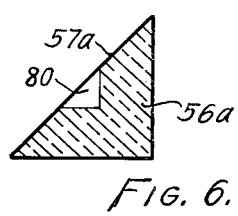
FIG. 6.
INVENTOR.
JOEL T. HARTMEISTER
BY
Anderson, Spangler & Wymore
ATTORNEYS United States Patent Office 3,216,309
Patented Nov. 9, 1965

3,216,309
OPTICAL RANGEFINDER AND TELESCOPE COMBINATION WITH SCALE READING REFLECTORS
Joel T. Hartmeister, P.O. Box 268, Aspen, Colo.
Filed Jan. 18, 1962, Ser. No. 167,061
3 Claims. (Cl. 88—2.4)

This invention relates to a range finding device and more particularly to improvements in range finding devices of the type forming the subject matter of my copending application Ser. No. 22,449 filed Apr. 15, 1960, now U.S. Patent No. 3,044,344, issued July 17, 1962 of which the present application is a continuation-in-part and such types as are suitable for use with an optical system such as a telescopic sight as used on small bore rifles.

Numerous attempts have been made in the past to provide an acceptable range finding device for use on game rifles and have met with varying success. Attempts have been made to adapt range finding devices as used in photography, but where telescopic sights are used, after spotting his target in the scope, the hunter must, of necessity, remove his eye from the eyepiece of the scope and sight through the range finder to determine the distance to the target. A means of determining distance to the target is more important when using a scope, rather than open sights, as distance is much more difficult to judge through the scope.

Where the existing split image range finding devices using split images or half silvered mirrors are attempted to be used in conjunction with a telescopic sight, the optics of the scope completely destroys the usual split image frustrating the attempt. Further, since prior art range finding devices are almost always calibrated with external reading dials, removal of the hunter's eye from the eyepiece of the scope is necessary to observe the range to the target.

It is an important object of the present invention to provide an improved range finding device which can be sighted through the optical system of a telescopic sight to take advantage of target magnification while providing good coincidence resolution.

It is a further object of the present invention to provide an improved range finding device wherein the range or distance to the target can be directly read through the telescopic sight without the necessity of observing external dials and the like which requires removal of the eye of the user from the eyepiece of the sight.

Another object of the present invention is to provide an improved direct reading range finding device which avoids one or more of the disadvantages of the prior art arrangements and which provides a true coincidence resolution.

It is a still further object of the present invention to provide an improved range finding device which is sturdy, economical of manufacture and is attractive in appearance.

For a better understanding of the present invention together with other and further objects thereof, reference is had to the following description taken in connection with the accompanying drawing and its scope will be pointed out in the appended claims.

In the drawing:

FIGURE 1 is a cross-sectional plan view of one embodiment of the invention with some parts broken away to show the internal arrangement;

FIGURE 2 is a view, partly in section, taken along line 2—2 of FIGURE 1;

FIGURE 3 is a diagrammatic representation of the relative positioning of the internal elements and the paths believed to be followed by the light internally of the range finding device;

FIGURES 4 and 5 respectively are illustrations of some different forms which the range calibrating scale may take; and FIGURE 6 is a cross-sectional view in plan of another form of beam combining prism according to the invention.

Referring to the drawing, the range finding device of this invention is seen to comprise an elongated housing or box 10 having sides 12 and 14, ends 16 and 18, a top 20 and a bottom 22. The box 10 is light proof, preferably having the interior painted black to avoid reflections, and sides 12 and 14 are provided with openings 24 and 26 respectively therein adjacent opposite ends 16 and 18. Side 12 is further provided with an opening 28 in alignment with the opening 26 in side 14.

A U-bracket 30, having an arm 32 connected to one leg, is pivotally mounted within box 10 adjacent end 16 as by means of a pin 34 journalled for rotation in holes in top 20 and bottom 22. Arm 32, remote from the pivot mounting, is provided with a downturned portion 36 having a threaded opening therethrough. A stud bolt 42, having a knurled head is journalled for rotation in a hole in side 14 in near alignment with the threaded opening of downturned portion 36 with bolt 42 being threaded into the threaded opening thereof. To avoid backlash between bolt 42 and the threaded opening of portion 36, arm 32 can be biased as by means of a spring 50 and the like.

A prism 52, having a silvered surface 54, is secured between the legs of U-bracket 30 with the reflecting surface facing opening 24 in side 12. A beam combining prism 56, having a mirrored surface 57, is positioned within box 10 adjacent end 18 thereof intermediate openings 26 and 28 in sides 14 and 12 respectively with the mirrored surface facing opening 26. Prism 56 is secured in position by means of a suitable adhesive and the like.

The range finding device is mounted upon a telescope 58 by means of a clamp 60 hingedly connected to the range finding device. The hinged connection is seen to comprise a pair of straps 62 and 64 fastened respectively to top 20 and bottom 22 of box 10 by suitable means. Straps 62 and 64 extend beyond side 14 and are provided with aligned bores. Clamp 60 is provided with a bore 66 and bolt 68 with bore 66 and the bores in the straps form a hinged connection between clamp 60 and box 10. A wing nut 70 secure bolt 68 to complete the connection.

Clamp 60 is provided with a bore 72 and the clamp is mounted on box 10 such that bore 72 is aligned with openings 26 and 28 in sides 14 and 12. Clamp 60 is provided with a slit 74 along one side of the bore 72. One or more stud bolts is passed through an opening to one side of the split 74 of clamp 60 and is threaded into the side of clamp 60 to the other side of slit 74. Bore 72 is of a size sufficient to receive the end of the telescope 58 and be securely clamped thereto by the tightening of bolts 76.

An extremely important aspect of the instant invention is found in the beam combining prism 56, which for the sake of clarity will be called the primary prism. It is by virtue of this prism that the improvement of direct reading of the range is made possible. The usual method of developing images in a range finding device comprises a prism or mirror having one-half silvered and the other half unsilvered. One image is directly viewable through the unsilvered portion while a second image is reflected from the other, or secondary prism, to the silvered portion where it is viewed.

When such a system is attempted to be used with a telescopic sight, the optical system of the scope will not accept the images so produced. As the object lens of the scope serves as a light gathering element, dividing the light reaching this lens along a diameter will not produce a usable separation of the image.

The applicant has found that this inherent deficiency can be overcome by viewing one image through a central portion of the lens system while viewing the other image through the balance thereof. This is best accomplished in practice by providing an unsilvered centrally located portion in the primary prism, while the image from the secondary prism is viewed on the silvered area of the primary prism surrounding the centrally located unsilvered area.

The quality of the optical system in a telescopic sight will in large part determine whether it is necessary for the line of sight of the viewer to substantially coincide with the optical axis of the scope. With a good optical system, the line of sight, or the position of the viewer's eye at the eyepiece need not coincide with the optical axis but may be off-center without resulting in objectionable distortion of the image. With a lower quality optical system the amount of deviation from the optical axis becomes increasingly smaller for satisfactory results.

Referring to FIGURE 1, primary prism 56 is seen to be provided with an aperture or bore 78 therein in substantial axial alignment with openings 26 and 28 in sides 14 and 12. FIGURE 6 shows another embodiment of the primary prism according to the invention identified as 56a. Prism 56a is provided with a bottomed bore 80 through the silvered surface 57a of the prism. The bottom of the bore 80 is preferably parallel to the surface through which the images are viewed to avoid objectionable reflections.

It has been found that bores 78 and 80 can be of a size up to and including about 10% of the area of the objective lens of a scope, the lens fartherest removed from the user's eye. The use of a larger bore results in a deterioration of the image separation and clarity. It is further found, where using a bore constituting about 10% of the area of the objective lens, that displacement of the bore more than one diameter off the optical axis fails to produce a satisfactory image combination. The amount of displacement permissable will further depend on the quality of the optical system. With a lower quality system, less displacement can be tolerated.

To afford a means of balancing the light between the primary and the secondary opening 28 may be provided with an adjustable slide, not shown, having different sized openings therein which may be selectively positioned in alignment with opening 28 to vary the amount of light passing therethrough. Various arrangements may be used and colored filters may be mounted in the openings of the slide for improved contrast between the images.

Telescope 58 is preferably mounted on a rifle for tiltable movement in a vertical plane relative to the rifle. The range finding device is provided with direct reading calibration which permits the viewer to determine the distance to target without removing his eye from the eyepiece of the telescope. Referring again to FIGURES 1, 2 and 3, one or more concave mirors 82 and 84 are mounted on the surface of prism 52 which is transverse to the length of box 10. A transparent calibrated scale 86 is positioned within box 10, intermediate prisms 52 and 56 and adjacent prism 56. In this instance mirrors 82 and 84 as well as scale 86 are positioned adjacent bottom 22 of box 10. A light gathering prism 88 is positioned in close proximity to scale 66 and in alignment with opening 90 through bottom 22. Opening 90 is provided with an adjustable slide 92 adapted to vary the light passing through opening 90 to illuminate scale 86. It will be recognized that opening 90, prism 88, scale 86 and mirrors 82 and 84 may be positioned adjacent top 12 of box 10 if desired to take advantage of overhead light. The side of calibratable scale 86 toward prism 52 is convex to provide a degree of magnification and the side away from prism 52 is a flat surface having thereon calibration indicia 94. Where two mirrors 82 and 84 are to be used the scale will appear like that of FIGURE 4. Mirrors 82 and 84 are designed to focus on the magnified image of the indicia 94, which image is visible to the viewer by means of the reflection thereof by prism 56 through the eyepiece of the scope. As best shown in FIGURE 3, mirror 82 is focused on the 450 yard mark on the lower scale of FIGURE 4, while mirror 84 is focused on the 450 yard mark of the upper scale. As the distance indicated increases, the focus of mirror 82 moves off the scale in an upwardly direction and mirror 84 provides an image of the yardages greater than 450 yards in the eyepiece. It will be understood that the smaller yardage indicia of each scale will be at the bottom of scale 86 as depicted in FIGURE 3. It will be appreciated that such matters as image inversion and reversal may be conveniently taken care of in the presenting of the calibration indicia on the scale.

A vane or shutter 96 may be secured on a shaft 98 which is journalled in sleeve 100 mounted in side 14 by suitable means. Shutter 96 can be selectively positioned to obscure or partially block the image from either mirror particularly when moving from one scale to the other or may be rotated out of the path of either mirror.

FIGURE 5 illustrates the form the calibration indicia 94a takes on scale 86a for use with a single mirror mounted on prism 52. The ranging device is calibrated in the manner well known in the art of sighting on targets of known distance and securing the scale to calibrate the scale at this distance where there is coincidence of the images. It is the usual practice to calibrate the devices at the time of manufacture to provide a fixed calibration, however, it is also contemplated that a micrometer adjustment means, not shown, may be provided for scale 86 to permit limited selected movement thereof transversely of box 10 for the purpose of periodic field calibration checks and possible correction.

It will be appreciated that the disclosed direct reading calibration is susceptible of successful use only with an image combining prism system of the type herein disclosed when used with a magnifying optical system. The deficiencies inherent in the use of the usual half silvered systems with magnifying optical systems defeat the successful use of direct reading calibration.

Although the above-described embodiments disclose the invention as applied to the telescopic sight of a small bore rifle, it is to be understood that the invention may also be employed with similar sights for large rifles or generally in combination with an optical system where image magnification is desired.

While there have been described what at present are considered to be the preferred embodiments of this invention, it will be obvious to those skilled in the art that various changes and modifications may be made therein without departing from the invention. It is aimed, therefore, in the appended claims to cover all such changes and modifications which fall within the true spirit and scope of the invention.

What is claimed is:

1. In combination with a telescope, a range finding device for use with the magnifying optical system thereof comprising an elongated housing closed at both ends, having sides, a top and a bottom; openings in one side adjacent each end of the housing, a viewing aperture in the other side in line with one of said openings in said one side; a fixed reflector mounted at an angle within the housing and positioned between the viewing aperture and the opening in line therewith; a moveable reflector mounted for pivotal movement within the housing in line with the other opening in said one side; means operatively engaging said moveable reflector for the selective angular positioning of same with respect to the fixed reflector, said fixed reflector having a centrally located bore through the reflecting angular surface; a transparent scale having distance indicia thereon mounted in said box intermediate the reflectors, and reflecting mirror means mounted on the moveable reflector for movement therewith positioned and aligned to reflect an image of a selected portion of said scale and said indicia thereon onto the reflecting surface of the fixed reflector, wherein an opening is provided in the box adjacent the location of the scale and there is further provided a light reflecting means which cooperates with said opening and said scale to direct external light onto the scale and illuminate same, said reflecting mirror means including a pair of reflecting mirrors mounted on the moveable reflector, with one mirror being positioned adjacent one side of the box and the other mirror adjacent the other side, with one mirror being aligned to reflect an image of the indicia at one end of the scale onto the reflecting surface of the fixed reflector while the other mirror is aligned to reflect an image of the indicia at the other end of the scale onto the reflecting surface of the fixed reflector and while one mirror is reflecting an image of the indicia intermediate of the ends of the scale, the other mirror is reflecting off the scale.

2. A range finding device according to claim 1, wherein the cross-sectional area of the bore comprises an area up to and including about 10% of the area of the object lens of the optical system with which it is to be used.

3. A range finding device according to claim 1, wherein each of the pair of reflecting mirrors is a concave mirror whose focal point is coincident with the positioning of the distance indicia of the scale.

References Cited by the Examiner

UNITED STATES PATENTS

| 563,196 | 6/96 | Marchand | 88—2.4 |
| 1,356,838 | 10/20 | Stein | 88—2.4 |
| 2,058,484 | 10/36 | Mihalyi | 88—2.4 |
| 2,107,936 | 2/38 | Gardner. | |
| 2,288,243 | 6/42 | Hyde. | |
| 2,346,076 | 4/44 | Mihalyi | 88—2.7 X |
| 2,994,257 | 8/61 | Papke | 88—1.5 X |
| 3,044,344 | 7/62 | Hartmeister | 88—2.4 |

FOREIGN PATENTS

| 958,226 | 9/49 | France. |
| 575,102 | 4/33 | Germany. |
| 909,046 | 4/54 | Germany. |

DAVID H. RUBIN, *Primary Examiner.*